Patented Feb. 16, 1943

2,311,112

UNITED STATES PATENT OFFICE 2,311,112

PROCESS FOR MILLING RUBBER

Charles A. Klebsattel, West Orange, N. J., assignor to The Martin Dennis Company, Newark, N. J., a corporation of New Jersey No Drawing. Application November 21, 1939, Serial No. 305,478

3 Claims. (Cl. 260—761)

The present invention relates to the treatment of natural and crude rubber, and more particularly to a method of hastening the "breaking down" of crude rubber when the same is milled, whereby the rubber acquires a desired plasticity with a minimum requirement of time and power.

Crude rubber in its original form and as it is initially made available to the manufacturer of rubber products, is characterized by poor plasticity, which is due in great measure to its high elasticity, "nervy" and spring-like characteristics which make the rubber mass highly resistant to flow. As a result of these physical characteristics, the crude rubber in its original form does not readily wet or absorb fillers, pigments and other ingredients which when uniformly mixed and incorporated with the rubber impart desirable characteristics thereto. In addition, this elasticity makes it difficult to mold, sheet or extrude the crude rubber in many desirable commercial forms. It is necessary, therefore, to alter this characteristic of the rubber in order to properly mix it with other ingredients and to mold it conveniently.

It is well known in the art that the undesirable characteristics of crude rubber discussed above may be modified by a milling process which subjects the crude rubber to a shearing and pulling action whereby the rubber is caused to "break down" into a plastic and flowable material. The most common type of mill that is used to subject the rubber to this plasticizing action is one utilizing a plurality of rolls revoloving at different speeds through which the rubber is passed. Banbury mixers which utilize eccentric blades and a housing for masticating the rubber as well as a Gordon plasticator, which is essentially a screw of varying pitch enclosed within a cylinder, may be used effectively. Generally the apparatus is water-cooled to absorb the heat generated in the plasticizing action. In general, any mechanism which exerts a shearing action upon the rubber mass will subject the rubber to sufficient strain to bring about a sufficient breakdown thereof so that the same may be molded and mixed with pigments and the like in accordance with the general practice.

As the milling of the crude rubber progresses, the mass gradually loses its undesirable spring-like characteristics and acquires a plasticity which permits the incorporation of pigments and fillers and the like. The rubber is first partially milled in order to be sufficiently plastic to work in the pigments and fillers, then carbon black and fillers are added to impart the necessary physical properties to the rubber and these are milled in. The fillers are preferably not incorporated until there is at least a partial breakdown. Other agents are often added to increase the wetting properties, and to cause the carbon black and fillers to be worked in more readily. The sulfur and accelerator are added last and milled in by the same process. The plastic molded product may be subsequently vulcanized in any regular manner or otherwise treated to place the same in a desired marketable condition.

The amount of power required to plasticize the rubber in accordance with the general practice is tremendous and is a major expense in producing rubber articles. The length of time of the milling operation now required is also a factor as it limits the amount of rubber that can be plasticized with a given piece of apparatus. The minimizing of this power requirement and of the length of the milling operation represent a substantial saving economically from a manufacturing standpoint. Particularly is this so if the saving in power can be accomplished without harming the rubber or interfering with its desirable properties in the final product or during the several stages of its manufacture.

It is an object of my invention to provide a method for hastening the plasticizing of the rubber when the same is milled whereby the time and power required is effectively reduced.

Another object of my invention is to effect the hastening of the desired plasticizing of the crude rubber without adversely affecting, and in many cases with beneficial effects on the later operations to which the rubber is normally subjected, such as vulcanization and the like.

A further object of my invention is to hasten the plasticizing of the rubber without causing an acceleration of the normal deterioration upon aging, common to rubber articles, so that the keeping qualities of products made in accordance with my invention will be at least comparable to that of rubber articles fabricated in the usual manner.

I accomplish the above objects, and others which will be readily apparent from the description, by incorporating a small proportion of chromic acid with the crude rubber during the milling step. I have found that the addition of this ingredient to the crude rubber causes an equivalent plasticizing of the rubber during milling in a fraction of the time normally required, and, in many cases, such addition assists in the subsequent vulcanization of the rubber, and the finished rubber products exhibit good keeping qualities comparable to that of rubber which has been milled in the usual manner.

My invention is applicable to the milling of crude rubbers generally, including pale crepe, and smoked sheets, and includes the treatment of all the usual commercial varieties available to the manufacturer of rubber goods which are susceptible to an improvement in plasticity by a milling operation.

In the simplest and preferred embodiment of my invention, the chromic acid (CrO₃) is added to the crude rubber at the beginning of the milling operation. The manner in which the compound is added does not appear to be critical and, for convenience, the compound in powdered form may be sprinkled upon the surface of the rubber being treated at the beginning of the milling operation. It is to be understood that it is unnecessary, although it may be convenient, to use a solvent for the chromic acid to facilitate its application to or absorption by the rubber. The amount of the compound to be added will depend, to some degree, upon the quality of the crude rubber being treated, the efficiency of the milling apparatus, and the extent to which it is desired to hasten the plasticizing of the rubber. As a general rule, amounts above 1% effect too rapid a plasticizing action to be desirable and do not permit effective control. Amounts as low as .01% yield a noticeable improvement, although decreasing amounts of the compound will have a decreasing effect upon the plasticizing of the rubber and a lower limit will be reached at which the effect upon the rubber will not warrant the expense of the addition of the compound. Amounts of the order of .1% to .5% are preferred.

The chromic acid used in accordance with my invention for addition to the crude rubber being milled may be used alone or in addition to any other substances which are normally added to the rubber with desirable results.

During the milling of the crude rubber, after some degree of plasticizing has been effected in accordance with my invention, fillers and pigments such as carbon black may be added to impart additional desirable physical properties to the rubber. Agents such as stearic acid may be added to increase the wetting properties of the rubber, which is desirable for assisting in the working-in of the carbon black and the fillers. Sulfur required for vulcanization, and accelerators therefor, which may be combined with the sulfur, are generally added during the last stages of the milling operation and prior to the steps in which the rubber is molded and vulcanized, for example, by hydraulic pressure or in a steam press.

The progress of the plasticizing of the crude rubber in the milling operation in accordance with my invention and, consequently, the effectiveness of the compound added, may be conveniently measured by the penetration into a solid mass of the rubber of a small ball under standard load, time and temperature conditions. Such tests show that the same degree of plasticity is attained in approximately ten minutes with the addition of 0.2% of chromic acid as is attained in twenty minutes when the crude rubber is milled without such addition. Thus it will be apparent that a great saving in time and power will be effected by the said addition.

The effectiveness of the chromic acid does not appear to be modified by any of the addition agents generally used in the manufacture of rubber. Furthermore, there has not been observed any undesirable effects of the added compound upon the effectiveness of such other addition agents or upon the physical treatment to which the rubber is normally subjected during fabrication.

The milled rubber may be cured or vulcanized by a combination with sulfur and with accelerators in a number of ways, the more common methods being known in the art as the "Captax," "Altax" and "Tuads" cures. These terms define the accelerator that is used, or the form in which the sulfur is added or combined with the accelerator. The "Captax" and the "Altax" cures refer to types in which free sulfur is milled into the rubber in addition to the accelerator. The "Tuads" cure refers to a type in which complex sulfur containing organic compounds are milled into the rubber, which compounds give up some of the sulfur content upon decomposition through heating. This liberated sulfur is effective in vulcanizing the rubber.

Pure gum stocks and rubber stocks containing carbon black may be milled with chromic acid and cured with "Captax" and "Altax" and "Tuad" as accelerators.

The addition of chromic acid in accordance with my invention during milling, does not interfere with the action of accelerators in either pure gum or black stocks and in some instances assists in the action. A product is obtained having a tensile strength equal to that obtainable when a compound is not employed to facilitate plasticizing, and in some instances improved tensile strength is obtained, and improved action of the accelerator.

Rubber which has been treated in accordance with my invention, and vulcanized, exhibits desirable aging characteristics. I have determined that such vulcanized rubber does not undergo any abnormal oxidation due to the presence of the chromic acid over a considerable period of time and, therefore, does not deteriorate abnormally.

It will be apparent that the addition of chromic acid to crude rubber during the milling operation in accordance with my invention effects a material saving in the milling operation in regard to time and power costs without adversely affecting the desired characteristics of the finished rubber product. Apparent variations of my invention which suggest themselves to those skilled in the art in view of the description of my invention are intended to be within the scope of my invention as defined in the following claims.

I claim:

1. A method of facilitating the plasticizing of crude rubber during a milling operation, prior to vulcanization, which comprises milling unplasticized crude rubber to which is added an amount of chromic acid which is of the order of about .01% to 1% based on the weight of the rubber.

2. A method of facilitating the plasticizing of crude rubber during a milling operation, prior to vulcanization, which comprises milling unplasticized crude rubber to which is added chromic acid in an amount of about .1% to .5% based on the weight of the rubber.

3. A method of facilitating the plasticizing of crude rubber during a milling operation, prior to vulcanization, which comprises milling unplasticized crude rubber to which is added chromic acid in an amount of about .2% based on the weight of the rubber.

CHARLES A. KLEBSATTEL.